3,066,943
PISTON RING
Arthur M. Brenneke, Hagerstown, Ind., assignor to Perfect Circle Corporation, Hagerstown, Ind., a corporation of Indiana
Filed Dec. 28, 1959, Ser. No. 862,187
5 Claims. (Cl. 277—139)

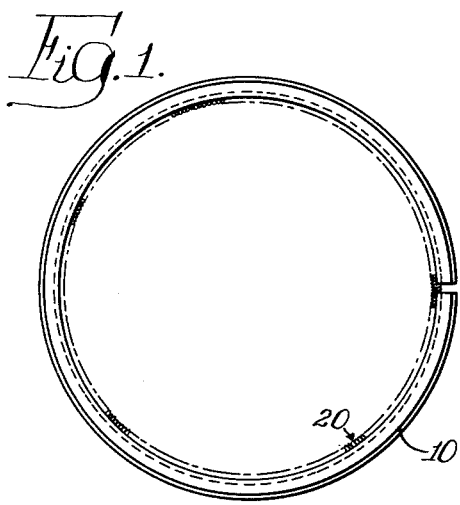
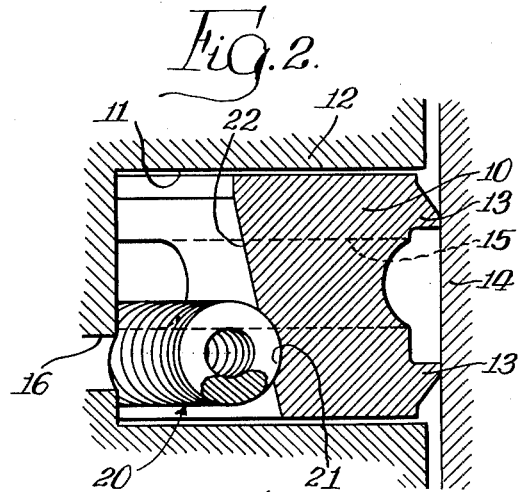
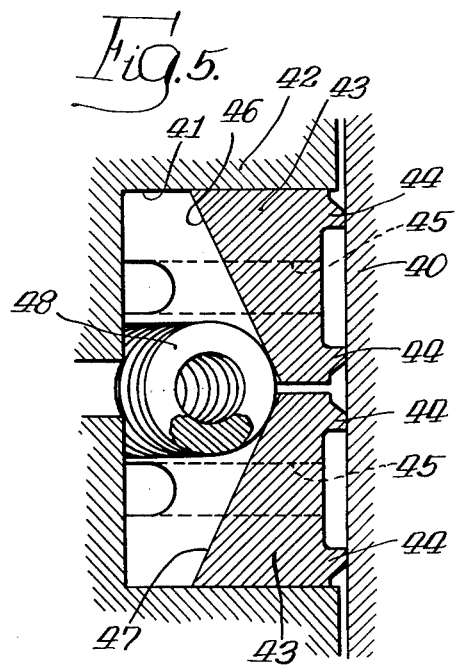
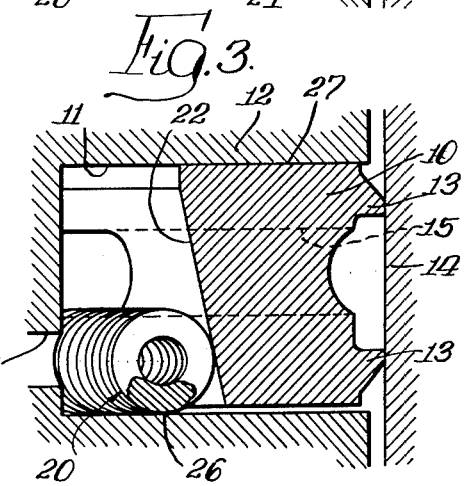
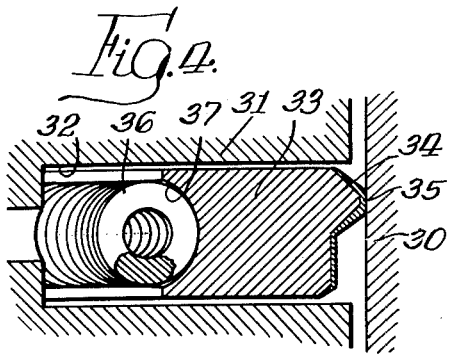
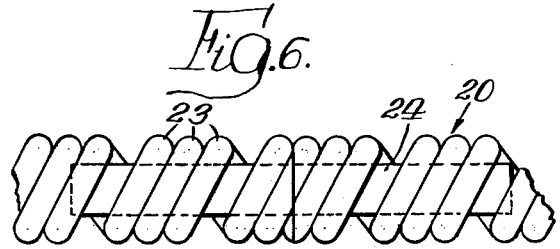

The invention relates generally to piston rings and more particularly to piston rings for internal combustion engines.

The general object of the invention is to provide a novel piston ring assembly comprising at least one ring member and a coiled spring for urging the ring member outwardly against cylinder wall.

Another object is to provide a ring assembly of the foregoing character, having a coil spring constructed to provide a maximum force for a small coil diameter for urging the ring member outwardly.

A further object is to provide a novel piston ring assembly comprising at least one ring member and a coiled spring for urging the ring member outwardly, the ring member being shaped so that the spring assumes the proper position relative to the ring member, thus facilitating proper mounting of the ring assembly in its groove in the piston.

Other objects and advantages will become apparent from the following description taken in connection with the accompanying drawing in which:

FIG. 1 is a plan view of a ring assembly embodying the features of the invention.

FIG. 2 is a radial sectional view, on an enlarged scale, of the ring assembly of FIG. 1 and showing the ring assembly mounted in a groove in a piston.

FIGS. 3, 4 and 5 are views similar to FIG. 2 but showing other embodiments of the invention.

FIG. 6 is a fragmentary elevational view of a spring used in the various embodiments of the invention.

The present invention contemplates a piston ring assembly comprising ring means in the form of at least one cylinder-engaging ring member, and a coiled spring for urging the ring member outwardly against the cylinder wall. The coiled spring usually employed in a ring assembly of this type comprises a single helical coil. For a given spring coil diameter, there are practical limits on the wire size used in making such a spring because of the difficulty in winding or coiling the wire of which the spring is formed. Also for a spring of such coil diameter there are practical limits on the number of turns of wire for a given length, and hence there is a practical limitation on the number of points of contact of the spring with the ring member.

One of the principal features of the present invention lies in the provision of a novel spring which exerts a maximum force for a predetermined spring coil diameter and a maximum number of points of contact of the spring with the ring member. Such spring comprises at least two helical coils having the same number of turns and intercoiled with each other. The force exerted by such spring on the ring member is thus equal to the sum of the forces exerted by the respective coils so that a maximum force is obtained for a predetermined spring coil diameter, and the spring has a maximum number of points of contact with the ring member.

Another important feature of the invention lies in the fact that the ring member is so constructed that the spring is self-positioning relative to the ring means. Thus, when placing a ring assembly embodying the present invention in a piston groove, it is unnecessary to exercise great care to be sure that the spring and ring means are properly positioned relative to each. By first placing the spring in the groove and then the ring means in the groove, the spring by virtue of its outward force automatically assumes the proper position relative to the ring means.

The ring means is preferably provided with one or more cylinder-engaging flanges and may also have radial slots to permit oil scraped from the cylinder wall to flow inwardly to the bottom of the groove. The position of the spring is such as to avoid interference with such flow of oil.

The embodiment shown in FIGS. 1 and 2 comprises ring means in the form of a ring member 10 mounted in a groove 11 of a piston shown fragmentarily at 12. The ring member 10 comprises an annular body having the usual gap and preferably provided with a pair of axially spaced flanges 13 adapted to engage a cylinder wall 14 and scrape oil therefrom. The ring member 10 is also provided with radial slots 15 to permit the oil scraped from the cylinder wall 14 by the flanges 13 to flow to the interior or bottom of the groove 11 from which it may be drained back to the crank case by the usual passages 16.

The ring member 10 is uged outwardly by a spring, indicated generally at 20. The ring member is so shaped that the outward force exerted by the spring tends to cause the spring to assume a predetermined position relative to the ring member. Thus, in this instance, the ring member 10 is provided with a spring receiving groove 21 on its inner periphery to provide a seat for the spring 20. The groove 21 is located at one side of the oil slots 15 so that the spring, when positioned therein, will not interfere with the free flow of oil. To cause the spring to automatically shift into the groove 21, when the assembly is mounted in the piston groove 11, the inner periphery of the ring member is slanted outwardly toward the groove 21, as at 22. Thus, the outward force exerted by the spring 20 on the ring member 10 will cause the spring to shift into the groove 21, if it is initially out of the groove. The spring is thus self-positioning relative to the ring member.

There are practical limitations on the coil diameter of the spring. Thus, in the embodiment shown in FIG. 2, a larger coil diameter would result in interference with the free flow of oil both through the slots 15 and in the piston groove 11 unless the pitch of the turns is large to provide an open coil. Even then carbon tends to accumulate in the coil. With such limitation on the coil diameter of the spring, there are practical limits on the size of wire of which the spring is made, since a heavier or larger wire size could not be readily coiled. For the usual spring consisting of one coil, there are thus limitations on the force exerted by the spring. Moreover, with a large pitch, only a predetermined number of points of contact of the turns of the spring with the ring member can be attained.

For the present invention, the spring 20 is constructed so that maximum force for a predetermined spring coil diameter and a maximum number of points of contact with the ring member are attained. Thus, the spring 20 comprises at least two helical coils 23 (see FIG. 6) each having the same number of turns, the coils 23 being intercoiled with one another. With this construction, the force exerted by the spring is equal to the sum of the forces exerted by the respective coils. For a spring comprising two coils, twice the force exerted by the usual spring will be obtained, and there will be twice as many points of contact with the ring member as there are for the usual single coil spring. In order to hold the spring in annular form, the ends may be welded together or fastening means, such as a short rod 24, may be inserted into the ends of the coils.

In the embodiment illustrated in FIG. 3, the ring member 10 is of the same construction as the ring member shown in FIG. 2, except that the groove 21 in the inner periphery of the ring member is omitted. The inner periphery of the ring member 10, in FIG. 3, is slanted downwardly and outwardly at 22, just as in the first form, so that the spring 20, due to its expansive force, is urged downwardly in the groove 11 and seats against the lower side of the groove 11 as at 26. The spring will thus automatically assume this position when the ring assembly is mounted in the groove 11. The spring 20 is of the same construction as that illustrated in FIGS. 2 and 6.

In this embodiment, the spring 20 has a wedging action on the ring member because of the slanted inner periphery 22, and the ring member is urged toward the upper side of the groove 11 into sealing engagement therewith, as indicated at 27.

The embodiment of FIG. 4 is adapted for use in a piston groove that is narrower than those of the other embodiments. Thus, for this embodiment, the cylinder is indicated at 30, the piston at 31, and the ring receiving groove at 32. The groove is shown as being of a narrow conformation, and the ring assembly of this embodiment comprises a relatively narrow ring member 33. The latter preferably is provided with a single cylinder-engaging flange 34 which in this instance is shown as having a chromium plating 35. A spring 36 of the same construction as employed in previously described embodiments is used in this embodiment and preferably is adapted to seat in a groove 37 formed in the inner periphery of the ring member 33. With a spring of this character and with the ring member having only a single flange 34, a high unit pressure against the cylinder wall is attained. The spring 36 of course will automatically seat itself in the groove 37 when the ring assembly is placed in the piston groove 32.

The embodiment of FIG. 5 provides a plurality of oil scraping flanges and also has sealing engagement with both sides of the groove in which it is mounted. Thus, it is shown as in engagement with a cylinder 40 and mounted in a groove 41 in a piston 42. The ring assembly of this embodiment has ring means comprising a pair of ring members 43, each being shown as having a pair of axially spaced cylinder-engaging flanges 44. Each ring member 43 is preferably provided with oil slots 45 opening inwardly from the space between the flanges 44.

The ring members 43 conjointly provide a groove to receive an outwardly bearing spring. Thus, the two ring members have their inner peripheries slanted, the upper ring member being slanted downwardly and outwardly as at 46 and the lower ring member being slanted upwardly and outwardly as at 47. The slanted inner peripheries 46 and 47 thus form a groove on the inner periphery of the ring means to receive a spring 48. The latter is of the construction shown in FIG. 6, and the large force exerted by this spring is of particular advantage in this embodiment because the spring bears against the two ring members. The slanted inner peripheries of the two ring members cause the spring to assume the position shown in FIG. 5, so that the spring bears substantially equally on the two members.

Since the spring bears against the slanted inner peripheries, it exerts a wedging action on the ring members, tending to force the upper ring member into sealing engagement with the uper side of the groove 41 and the lower ring member into sealing engagement with the lower side of the groove 41.

I claim:

1. A piston ring assembly comprising cylinder-engaging ring means, and a helical coil spring of substantially uniform coil diameter bearing outwardly against the inner periphery of said ring means, said spring comprising at least two helical coils having the same number of turns and intercoiled with each other, the force exerted by said spring on the ring means being equal to the sum of the forces exerted by the respective coils, thereby obtaining maximum force for a predetermined spring coil diameter and a maximum number of points of contact with the ring means.

2. A piston ring assembly according to claim 1, in which the inner periphery of said ring means is shaped to cause the spring to shift to a predetermined position relative to the ring member.

3. A piston ring assembly adapted to be mounted in a groove in a piston, comprising a cylinder-engaging ring member, and a helical coil spring bearing outwardly against the inner periphery of said ring member, said ring member having a groove in its inner periphery adjacent one side of said ring member, the inner periphery of the ring member being slanted outwardly toward said groove whereby the outward pressure of said spring tends to shift it into said groove.

4. A piston ring assembly adapted to be mounted in a groove in a piston, comprising a cylinder-engaging ring member, and a helical coil spring bearing outwardly against the inner periphery of said ring member, the inner periphery of said ring member being slanted relative to its axis throughout substantially its entire axial width, thereby causing said spring to shift toward one side of the ring member and bear outwardly against the ring member at said one side thereof, said ring member having radially extending oil slots axially offset from said spring to permit free flow of oil through said slots.

5. The combination of a piston having a ring-receiving groove therein, and a piston ring assembly mounted in said groove, said piston ring assembly comprising a cylinder-engaging ring member, and a helical coil spring bearing outwardly against the inner periphery of said ring member, the inner periphery of said ring member slanting outwardly relative to its axis toward one side of said groove, said spring bearing against one side of said groove and said ring member being in sealing engagement with the other side of said groove by virtue of the outward pressure of the spring against said slanted inner periphery of the ring member.

References Cited in the file of this patent

UNITED STATES PATENTS

| 1,418,918 | Hall | June 6, 1922 |
| 1,767,711 | Solenberger | June 24, 1930 |
| 2,058,420 | Deegan | Oct. 27, 1936 |
| 2,170,970 | Johnston | Aug. 29, 1939 |
| 2,439,702 | Teetor | Apr. 13, 1948 |
| 2,988,409 | Fuhrmann | June 13, 1961 |

FOREIGN PATENTS

| 6,062 | Great Britain | Apr. 24, 1888 |
| 394,175 | Great Britain | June 22, 1933 |